United States Patent [19]

Davis

[11] 4,403,590
[45] Sep. 13, 1983

[54] ENGINE FUEL CONSUMPTION REDUCTION SYSTEM

[75] Inventor: James P. Davis, Anaheim, Calif.

[73] Assignee: Rodew International, Alta Loma, Calif.

[21] Appl. No.: 285,413

[22] Filed: Jul. 20, 1981

Related U.S. Application Data

[63] Continuation of Ser. No. 18,507, Mar. 8, 1979, abandoned.

[51] Int. Cl.³ ............................................. F02M 31/00
[52] U.S. Cl. ....................................... 123/557; 165/51
[58] Field of Search ................. 123/557, 1 A; 165/51, 165/52

[56] References Cited

U.S. PATENT DOCUMENTS

| | | | |
|---|---|---|---|
| 3,951,124 | 4/1976 | Fairbanks | 123/557 |
| 3,955,546 | 5/1976 | Lee | 123/557 |
| 3,968,775 | 7/1976 | Harpman | 123/557 |
| 3,986,486 | 10/1976 | Rabbiosi | 123/557 |
| 4,072,138 | 2/1978 | Hawkins | 123/557 |
| 4,092,962 | 6/1978 | Beaton | 123/557 |
| 4,106,453 | 8/1978 | Burley | 123/557 |
| 4,146,002 | 3/1979 | Quinn | 123/557 |
| 4,161,160 | 7/1979 | Hichs | 123/557 |
| 4,170,960 | 10/1979 | Germack | 123/557 |

Primary Examiner—Ronald H. Lazarus
Attorney, Agent, or Firm—Harry M. Weiss

[57] ABSTRACT

A system for improving the fuel economy of internal combustion engines comprises a thermostatically controlled heater located in the fuel line between the fuel tank and the carburetor for heating the fuel to a temperature just below its vaporization temperature. This temperature is controlled to result in a more complete vaporization of the fuel upon entering the carburetor. Another part of the system supplies a fuel additive in the form of a xylene/oil mixture into the carburetor by way of the vacuum advance line to add approximately one ounce of the additive mixture to every fifteen to twenty gallons of fuel. Significant fuel economy has been realized along with a cooler exhaust temperature of the combustion products and a reduction in the amount of pollutants in the engine exhaust.

1 Claim, 11 Drawing Figures

ENGINE FUEL CONSUMPTION REDUCTION SYSTEM

This application is a continuation of application Ser. No. 018,507, filed Mar. 8, 1979 now abandoned.

BACKGROUND OF THE INVENTION

As a result of an increasing world awareness of the finite availability of petroleum-based fossil fuels, fuel consumption of automobiles, trucks and other vehicles which use such fuel has become an item of substantial concern. In the recent past, little thought was actually given to the fuel economy of the popular-sized automobiles in use in many countries of the world, particularly in the United States. Gasoline was available at relatively reasonable prices, and more interest was placed in the speed, power, and large size of automobiles than was given to the economy with which the automobiles operated.

With the realization that there is an energy crisis in the world, coupled with skyrocketing increases in the costs of gasoline and other fuels, individuals, manufacturers, and governments have been forced to carefully scrutinize the fuel consumption of the average automobile. In the United States, the government has issued regulations which require automobiles currently manufactured and those which are to be manufactured in the near future to perform with fuel economies well above the fuel consumption of the gas-guzzling automobile in its most wasteful years. In order to meet the government requirements, automobiles of smaller size and of lighter weight with smaller engines are being manufactured. Even so, the increasing price of gasoline and other petroleum fuels make ever increasing fuel economies for automobiles of all sizes a particularly desirable goal.

While possible new engine designs, and lighter weight materials and smaller automobiles may well produce high miles-per-gallon ratings for new automobiles to be produced in the near future, the older automobiles still on the road, and many of which most likely will be driven for many years, do not exhibit the fuel efficient characteristics of current new and future automobile production.

Therefore it is desirable to provide a system which can be incorporated into existing motor vehicles to improve their fuel economy and which also may be included in future production automobiles to extend even further the expected fuel economy which is being designed into those automobiles. Such a system should not impair the operation of the engine or accelerate its wear and ideally should be simple and relatively easy to install with a minimum of cost and effort.

SUMMARY OF THE INVENTION

Accordingly it is an object of this invention to provide a system for increasing the fuel economy of an engine.

It is another object of this invention to provide a system which may be added to existing engines to increase their fuel economy.

It is an additional object of this invention to increase the temperature of the fuel entering the fuel distributing device for an engine to increase the fuel economy of the engine.

It is yet another object of this invention to improve the fuel economy of an engine by increasing the temperature of the fuel entering the fuel distributing device for the engine to a temperature selected to enhance the vaporization of the fuel in the fuel distributing device and further to supply a combustion aiding fuel additive in a metered amount to the fuel at the fuel distributing device of the engine.

In a preferred embodiment of the invention, a system for increasing the fuel economy of an engine fueled by a liquid petroleum fuel has a fuel heater located between the source of the fuel and the fuel distributing device for the engine for heating the fuel. The fuel is heated to a predetermined temperature, and a temperature sensing device is located to sense the temperature of the fuel entering the fuel distributing device to control the operation of the heater to maintain the temperature of the fuel at the predetermined temperature.

In a more specific embodiment of the invention, a metering device is added to the system for supplying a combustion aiding fuel additive into the fuel at the fuel distributing device for the engine.

BRIEF DESCRIPTION OF THE DRAWINGS

FIG. 5 is a cross sectional view of another portion of the apparatus shown in FIG. 1;

FIG. 6 shows in a cross section view the additive reservoir and its components

FIGS. 7 and 8 show details of the apparatus shown in FIG. 6;

DETAILED DESCRIPTION OF THE PREFERRED EMBODIMENT

Reference now should be made to the drawings, in which the same reference numbers are used throughout the several figures to designate the same or similar components.

Figure 1:
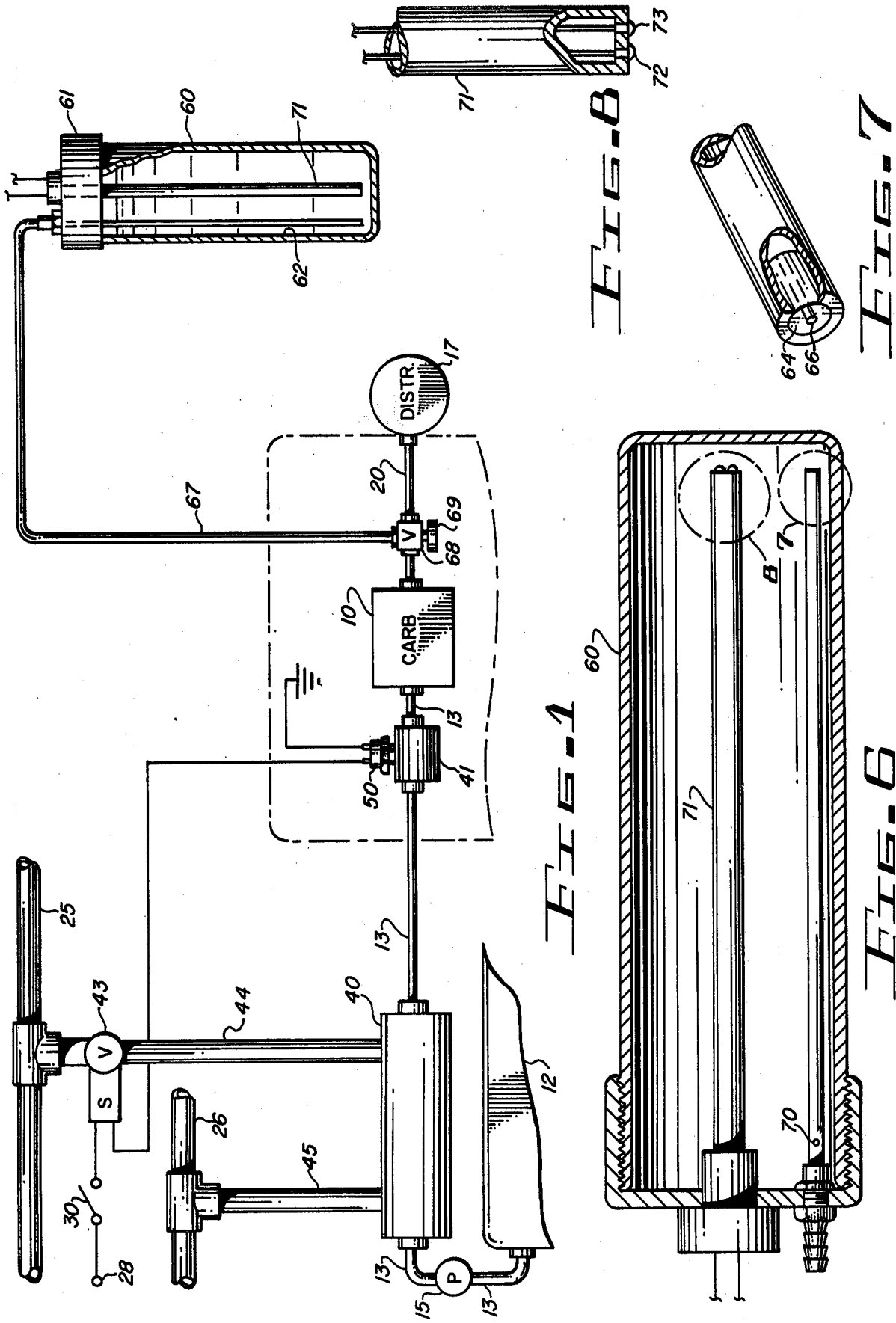
FIG. 1 is a diagramatic representation of a preferred embodiment of the invention, showing its interconnection with the standard components associated with a motor vehicle engine.

FIG. 1 is a diagramatic representation of a preferred embodiment of the invention illustrating its interconnection with the standard components found on a conventional internal combustion engine of the type commonly used in automobiles and trucks. Since the details of such engine and the associated accessories are old and well known, these details have not been shown in FIG. 1 to avoid unnecessary cluttering of the drawing. Only those portions which interconnect with the components of the system made in accordance with the preferred embodiment of the invention have been indicated in diagramatic form.

The apparatus of the preferred embodiment works in conjunction with the carburetor 10, wich may be any one of a number of different conventional carburetors readily available on the market and in common use with internal combustion gasoline engines. Fuel for the engine normally is supplied from a fuel tank 12, only a portion of which is shown in FIG. 1, through a fuel line 13 under the control of a fuel pump 15 to the carburetor. A distributor 17 is employed with most internal combustion engines to control the firing of the spark plugs; and the operation of the distributor in turn is controlled by way of a vacuum supplied to it through a vacuum advance line 20 interconnecting the distributor and the carburetor 10.

Most of the internal combustion engines used in automobiles and trucks at the present time are water cooled or liquid cooled engines, and the vehicle includes a radiator (not shown) which holds a reservoir of cooling fluid and to which a heater input hose 25 and a heater return hose 26 are connected. Only short sections of such hoses are illustrated in FIG. 1 since the hoses 25 and 26 and their interconnections with the radiator and the rest of the vehicle cooling system are conventional.

Automobiles and trucks also have a direct current power supply in the form of a storage battery and include an ignition switch which is used to disable the vehicle when it is not in use and which, when closed, activates the various operating electrical circuits of the vehicle. In FIG. 1, the positive terminal 28 of the vehicle battery (not shown) is illustrated along with the ignition switch 30. The conventional ignition circuit, starter circuit, light circuits and the like for the vehicle have not been shown in FIG. 1; but a control circuit used in conjunction with the preferred embodiment of this invention is shown connected to the ignition switch 30. When the switch 30 is closed, the circuit of the system shown in FIG. 1 is activated.

In a conventional vehicle, the fuel line 13 passing through the fuel pump 15 is extended in an uninterupted path to the carburetor 10 to supply fuel to the carburetor under control of the accelerator (not shown) by the operator of the vehicle. In FIG. 1 this path of the fuel line 13 has been modified to insert a heat exchange unit 40 and a heat sensing chamber 41 into the fuel line between the fuel pump 15 and the carburetor 10. The heat exchange unit 40, in turn, is connected to the inlet heater hose 25 through a normally-open, electrically-operated, solenoid valve 43 by means of an inlet pipe 44. Similarly, the opposite end of the heat exchange unit 40 is connected to the heater return hose 26 by way of a coupling pipe 45.

Figure 3:
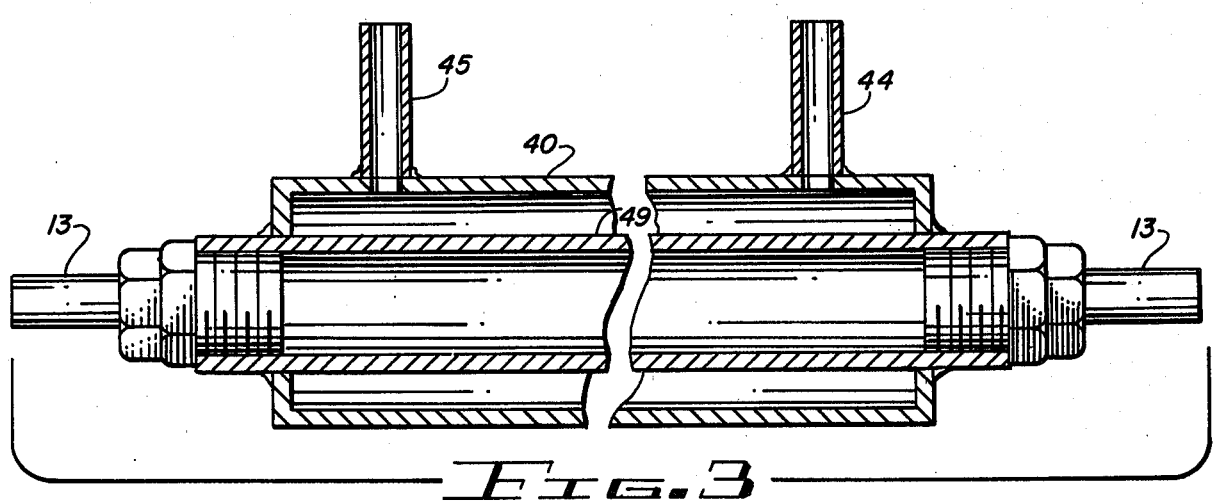
FIG. 3 is a cross sectional view of the apparatus shown in FIG. 2.

Whenever the valve 43 is open, heated coolant available from the heater hose 25 passes through the valve 43 and through the pipe 44 into the heat exchange unit 40. The fuel supplied through the fuel line 13 to an internal fuel pipe 49 (shown most clearly in FIG. 3) of the unit 40 then is heated as it passes through the heat exchange unit 40. So long as the valve 43 is open, the hot fluid flows through the pipe 44 into the heat exchanage unit 40 and exits through the pipe 45, merely bypassing a small portion of the fluid normally supplied to the vehicle heater. The path provided by the pipes 44 and 45 is in parallel to the conventional path through the vehicle heater, so that it does not interfere with the normal operation of the heater and can be used independently of the vehicle heater operation. Various internal configurations may be employed within the heat exchange unit 40 to maximize heat transfer to the fuel in the pipe 49.

It has been found that if the gasoline supplied to the carburetor 10 is heated to a point which is just below its vaporization temperature (approximately 130 degrees Farenheit) the efficiency of operation of the engine is significantly improved. For a gasoline internal combustion engine, the temperature at which the gasoline is supplied to the carburetor 10 should be within the range of 115 degrees to 130 degrees Farenheit, and for most vehicles a temperature of 125 degrees Farenheit appears to be an optimum temperature. At this temperature, expansion of the ruel volume by as much as 40 percent over the volume of unheated fuel takes place. When the fuel is at a temperature below this range, no differences in the fuel economy of the vehicle are realized over a standard vehicle in which the fuel line 13 is connected directly to the carburetor 10 from the fuel pump 15. On the other hand, if the fuel is heated to a temperature above 130 degrees, premature vaporization of the fuel takes place and improper engine operation results.

In order to prevent premature fuel vaporization and yet insure that the fuel supplied to the carburetor 10 is in the optimum temperature range (and preferably as close to 125 degrees Farenheit as possible) the heat chamber 41 is inserted into the fuel line 13 adjacent to the carburetor 10. The chamber 41 has a thermostatic temperature sensing switch 50 fastened into it and extending into the hollow interior of the chamber 41 to sense the temperature of the fuel passing through the chamber 41 to the carburetor 10.

To switch contacts of the thermostatically controlled switch 50 are connected in series circuit with the relay coil of the solenoid actuated electrical valve 43 and the ignition switch 30 between ground and the positive terminal 28 of the vehicle voltage supply or battery. Whenever the ignition switch 30 is closed (which is the state of the switch during the normal vehicle operation) the control of current flow through the solenoid actuated valve 43 then is effected by the switch 50, which normally is open.

During initial vehicle startup and during a substantial portion of the vehicle operation, the switch 50 remains open. Thus, the valve 43 in turn remains open, permitting the heated engine coolant to flow through the pipe 44 and through the heat exchanger 40 to exit from the pipe 45, as explained previously. If the temperature sensed by the thermostatically controlled switch 50 in the chamber 41 exceeds a pre-established temperature (such as the optimum 125 degree temperature mentioned above) the switch contacts 50 are closed to complete an operating circuit through the coil of the solenoid actuated valve 43, causing the valve 43 to operate and close. As a consequence, no additional heated engine coolant is passed through the pipe 44 to the heat exchanger 40; so that excessive heating of the fuel in the fuel line 13 is prevented. As soon as the fuel temperature drops below the pre-established temperature to which the thermostatically controlled switch 50 is set (typically below 120° Farenheit), it once again opens, thereby breaking the circuit through the solenoid actuated valve 43 to permit the valve 43 once again to open and cause heating fluid to pass through the heat exchanger 40.

The temperature at which the thermostatically controlled switch 50 closes and opens can be set to be within the range of ±2 to 5 degrees of 125 Farenheit to avoid undesirable chattering or rapid opening and closing of the switch 50 during the vehicle operation. This limited range or hysteresis in the operation of the switch 50 maintains the desired operating temperature of the fuel sufficiently close to the optimum of 125 degrees Farenheit that any variations in performance which result from the slight changes fuel temperature supplied to the carburetor 10 are essentially insignificant.

While improved fuel economy has been realized by the use of the portion of the system which has just been described, even greater fuel economy is obtained by introducing limited amounts of a fuel combustion aiding additive consisting of 30 percent xylene and 70 percent heavy lubricating oil (ideally 100 weight viscosity) into the carburetor 10 by way of the vacuum advance line 20. This additive is placed in a reservoir 60 which can be located at any convenient position within the engine compartment. The additive is withdrawn from the reservoir 60 by way of a metered inlet tube 62 which has its lower end extending to a point near the bottom of the reservoir 60. This lower end of the tube 62 is closed up with a plug 64 having a small metering inlet hole 66 drilled through it. In an embodiment of the invention which has actually been constructed and operated, the hole 66 has a diameter of 0.020 inches.

The tube 62 is then connected to the vacuum advance line 20 by way of a supply line 67 through a needle valve 68 having an adjustment knob 69 on it. The needle valve 68 is used to further adjust the flow of the additive mixture from the reservoir 60 into the vacuum advance line 20 and the carburetor 10 beyond the gross adjustment provided by the hole 66 in the end of the metering tube 62.

In the use of the system shown in FIG. 1 in different automobiles having different sizes of engines, it has been found that the amount of additive which is added to the gasoline in the carburetor 10 may ve varied in a range of 1 ounce of additive for every 15 to 20 gallons of gasoline for most beneficial results. The precise amount which is supplied must be determined empirically and is controlled by adjustment of the needle valve 68 through the adjustment knob 69. The xylene apparently increases the fuel BTUs and further acts as a cleaner to remove carbon gumming deposits and to free sticking valves in the engine. The high grade high viscosity oil of the additive provides necessary upper cylinder lubrication which assists in sealing the rings and valves and reduces cylinder wear.

An unexpected advantage of the complete system shown in FIG. 1 has been the reduction in the temperature of the exhaust products from each of the cylinders of the engine. This reduction has been measured in a range of approximately 5 degrees Farenheit to 15 degrees Farenheit for each cylinder of the engine over the exhaust temperatures of the same engine without the system of FIG. 1 installed on it. As a consequence, it appears that the system should result in a longer life in the operation of the valves of the engine. Another advantage which has been realized is that the undesirable pollutants in the exhaust emissions have been reduced by the system over those produced by the same engine without the system installed on it. It is believed that this reduction in the emission of pollutants results from an improved combustion of the fuel resulting from a combination of the optimum temperature of the fuel supplied to the carburetor 10 in conjunction with the metered small amounts of the xylene/oil additive supplied to the carburetor 10 through the vacuum advance line 20.

To further improve the mixing of the additive in the carburetor 10, a small hole (0.010 inch diameter) 70 is drilled through the metered inlet tube 62 near its upper end to admit a small amount of air into the additive drawn through the tube 62 and the line 67 to the valve 68. This air creates turbulence in the additive, and premixes the additive with air prior to supplying the additive to the carburetor where it is further combined with air and fuel which then is supplied to the engine cylinders.

Since it is necessary from time to time to replace the additive in the reservoir 60, a low level switch 71 is extended through the cap 61 on the reservoir 60 and has a pair of contacts 72 and 73 at its lowermost end located near the bottom of the reservoir 60. The low level switch 71 ideally is connected with some type of indicator light or warning indicator located on the instrument panel of the vehicle and provides a warning indication whenever the fluid level drops below the two contacts 72 and 73 located at the bottom of the switch 71. Obviously the level at which the switch 71 is activated may be varied in accordance with the desired operating characteristics of the system, and should be at some level where a sufficient amount of additive fluid remains in the reservoir 60 to permit the vehicle operator to conveniently locate additional additive and refill the reservoir 60 by removing the cap 61 and pouring additional additive into the reservoir 60. If desired a float-type sensing switch could be used in place of the low level switch 71 which has been shown.

Figure 2:
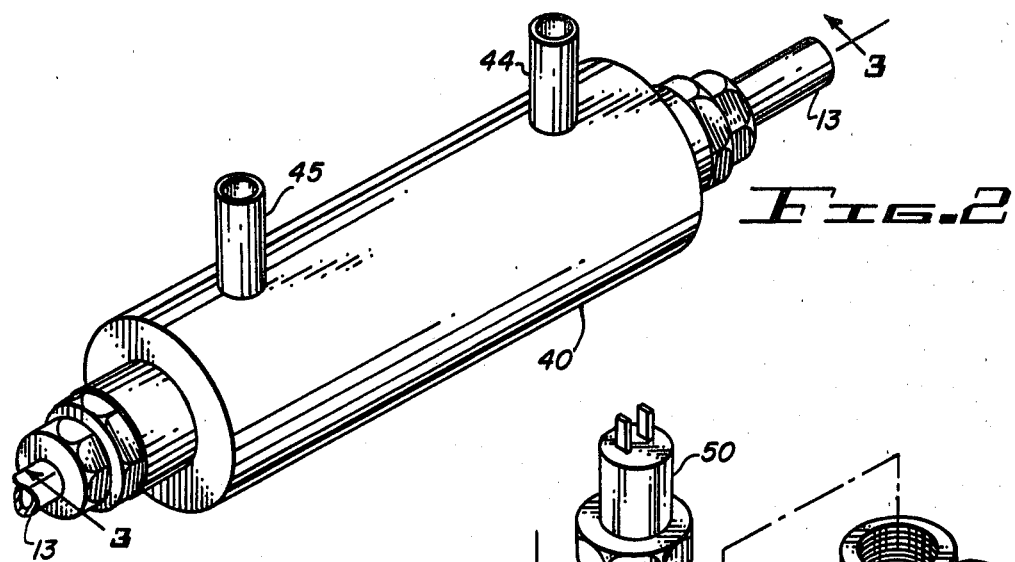
FIG. 2 is a perspective view of a portion of the apparatus shown in FIG. 1.
Figure 9:
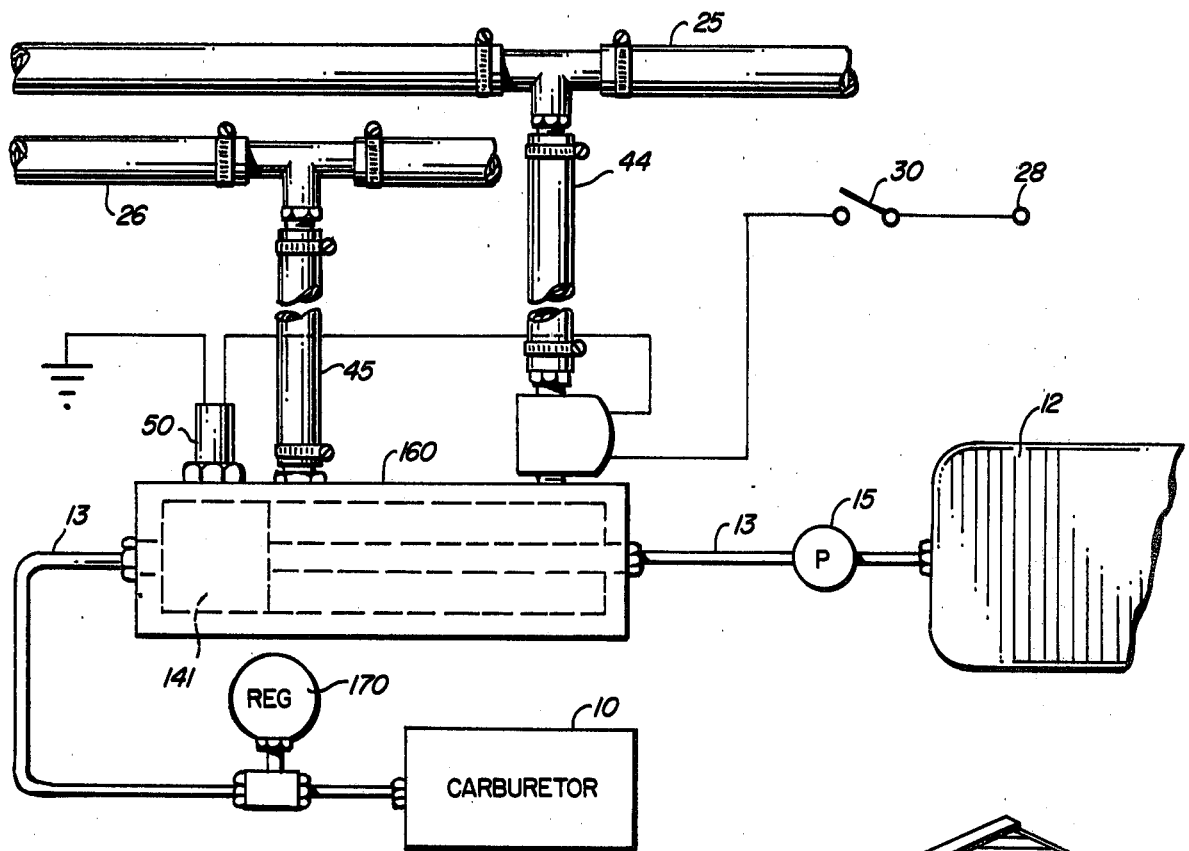
FIG. 9 is a diagramatic representation of another embodiment of the invention.
Figure 10:
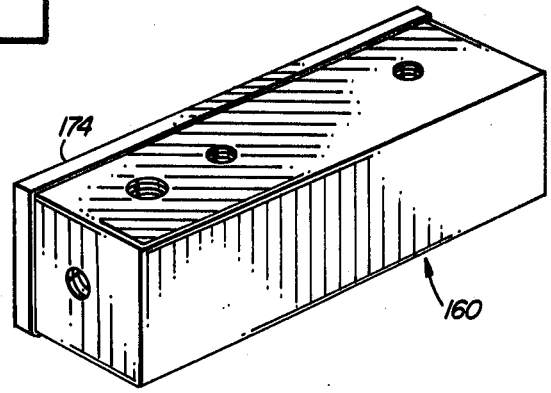
FIGS. 10 and 11 show details of the embodiment of FIG. 9.
Figure 11:
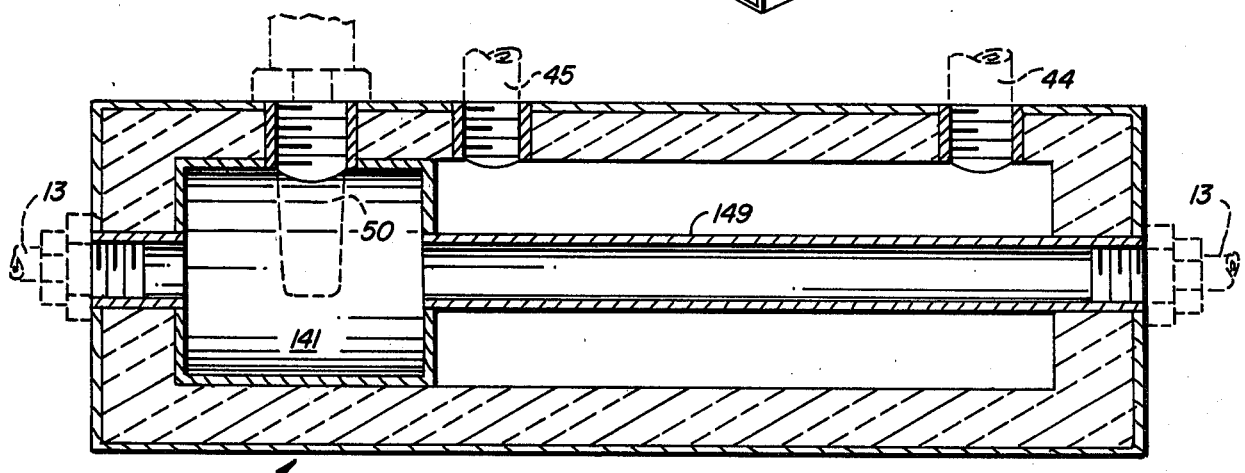

Reference now should be made to FIGS. 9, 10 and 11 which illustrate an alternative embodiment to the one which has been described above. The same reference numbers are used in these figures to designate the same components which are shown in FIG. 1. Essentially, the primary difference between the embodiment of FIGS. 9, 10 and 11 and the embodiment shown in FIG. 1 is that the heat exchange unit 40 and the thermostat heat chamber 41, shown as separate components in FIG. 1, have been combined together in a composite unit 160 in the embodiment of FIG. 9, 10 and 11. The unit 160 also is of a square or rectangular cross section instead of the circular cross section of the heat exchange unit 40 of FIGS. 1, 2 and 3. Similarly the thermostat heat chamber 141 of the embodiment shown in FIGS. 9, 10 and 11 also is of a square or rectangular cross section instead of the circular cross section shown in FIGS. 4 and 5 for the embodiment of FIG. 1. A cover 174 is removably placed on one side of the unit 160 to permit access to the unit for repairs and the like.

In the alternative embodiment of FIGS. 9 and 10, the space between the heat exchange region surrounding the fuel pipe 149 passing through the unit and the outer casing of the unit 160 is filled with a suitable insulation material 171, such as fiberglass insulation, foam insulation or the like. It has been found that the insulation 171 improves the operating characteristics of the unit and permits more accurate control of the heating of the fuel by means of the water passing into and out of the heat exchanger from the pipes 44 and 45.

In the embodiment of FIG. 9, the valve 43 also is shown located closer to the inlet of the heat exchange 160 instead of occupying the more remote location shown in the embodiment of FIG. 1. The operation of the unit shown in FIGS. 9, 10 and 11 is the same as that described above in conjunction with the embodiment diagramatically indicated in FIG. 1. It has been found that by incorporating the heat chamber 141 with the heat exchanger for heating the fuel passing through the fuel pipe 149, more accurate temperature control is effected. The thermostat chamber 141 on the exit side of the unit 160 is connected as close as possible to the carburetor 10; so that the temperature of the fuel passing through the fuel line 13 to the carburetor 10 is as close as possible to the desired optimum operating temperature controlled by the heat exchange unit 160.

In addition to the modifications described above in the alternative embodiment of FIGS. 9, 10 and 11, a fuel pressure regulator 170 is shown connected between the carburetor 10 and the fuel line exiting from the unit 150. The pressure regulator is inserted into the system just before the fuel enters the carburetor to prevent pressure variations of the heated fuel in the fuel line 13 from adversely affecting the system operation. It is apparent that a pressure regulator of this type also could be inserted between the chamber 41 and the carburetor 10 of the embodiment shown in FIG. 1. The pressure regulator 170 functions the same in both of the embodiments of the invention which are illustrated in the drawings.

Figure 4:
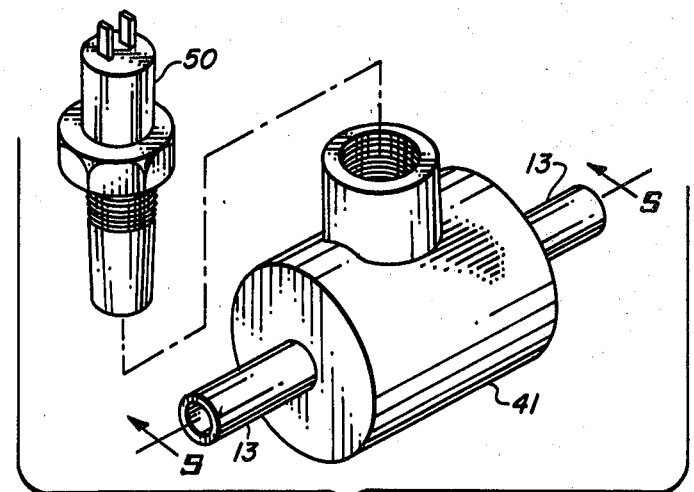
FIGS. 4 and 5 illustrate details of another portion of the apparatus shown in FIG. 1.
Figure 5:
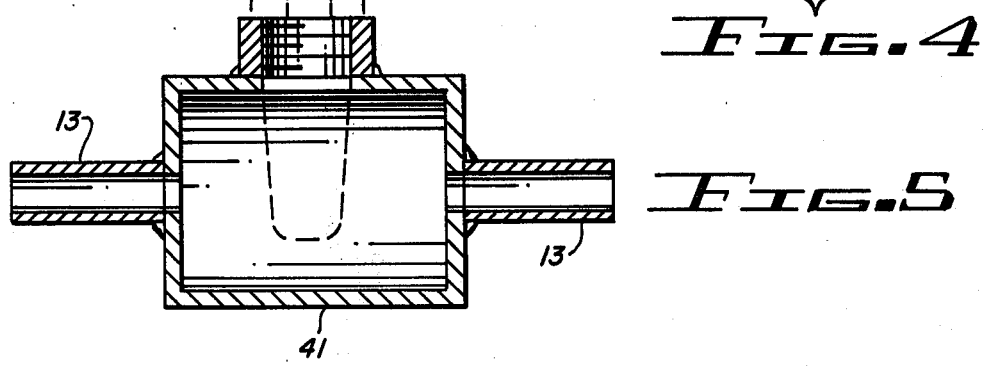

Various materials may be used to construct the heat exchangers of the embodiments which have been described and to construct the heat chamber 41 of FIGS. 1, 4 and 5. Die cast or machined metals or suitable plastic materials having the necessary operating characteristics may be used. Various types of materials and manners of fabrication will occur to those skilled in this art.

The foregoing description of the preferred embodiment of the invention shown in the drawings is to be considered as illustrative of the invention only and is not to be considered as limiting of the true scope of the invention. Various modifications will occur to those skilled in the art without departing from the scope of the invention, such as variations in the construction in the heat exchange unit 40, different techniques for sensing the temperature of the fuel for controlling the operation of the valve 43, and the like.

I claim:

1. A system for increasing the fuel economy of an engine fueled by a liquid petroleum fuel and having a source of fuel and a fuel distributing device, said system including in combination:

heating means having a fuel inlet and a fuel outlet located between said source of fuel and said fuel distributing device for heating said fuel to a predetermined temperature;

a linear fuel line located within said heating means;

an enlarged fuel chamber located within the heating means and positioned at the output portion of said linear fuel line for providing more accurate temperature control;

said heating means having proximity to said fuel distributing device;

insulating means at least partially surrounding said herating means for substantially thermally isolating said heating means at the location where said heating means is transferring heat to said fuel;

sensing means located within said insulating means and within said enlarged fuel chamber for sensing the temperature of fuel entering said fuel distributing device for controlling the temperature of said fuel at said predetermined temperature;

said sensing means comprising a thermostatic switch means coupled with said heating means for turning off said heating means when the temperature of said fuel entering said fuel distributing device exceeds said predetermined temperature by a predetermined amount;

said engine comprising a liquid cooled engine having a cooling system;

said heating means comprising a heat exchanger connected with said engine cooling system to obtain heat therefrom;

said fuel being supplied from the source of fuel to said fuel distributing device through a fuel line coupled in heat exchanging relationship with said heat exchanger;

means for supplying fluid from said engine cooling system to said heat exchanger;

a valve for controlling the flow of heating fluid from said engine cooling system through said heat exchanger so that said sensing means can operate to open said valve when the temperature of said fuel is above said predetermined temperature;

said valve comprising an electrically operated valve;

said temperature sensing means comprising said thermostatic switch means connected in series with said electrically operated valve across a voltage supply;

said enlarged chamber means comprising a heat chamber disposed proximal to said heating means outlet so that a portion of said thermostatic switch means is placed in said fuel proximal to and in communication with said fuel distributing device;

said fuel comprising gasoline; and said predetermined temperature having a range of about 115° F. to about 130° F.

* * * * *